DIVIDER UTILIZING MULTIPLES OF A DIVISOR

Filed Nov. 15, 1961 4 Sheets-Sheet 1

COMPUTER

INVENTORS
CLAUD M. DAVIS
JOHN A. deVEER

BY Carl C. Kling
ATTORNEY

Feb. 8, 1966 C. M. DAVIS ETAL 3,234,366

DIVIDER UTILIZING MULTIPLES OF A DIVISOR

Filed Nov. 15, 1961 4 Sheets-Sheet 3

PROGRAM UNIT

TRANSLATOR

CODES

| 4421 CODE | | | | DECIMAL | 2/5 CODE | | | | |
|---|---|---|---|---|---|---|---|---|---|
| 4A | 4B | 2 | 1 | | 0 | 1 | 2 | 3 | 6 |
| | | | X | 1 | X | X | | | |
| | | X | | 2 | X | | X | | |
| | | X | X | 3 | X | | | X | |
| X | | | | 4 | | X | | X | |
| X | | | X | 5 | | | X | X | |
| X | | X | | 6 | X | | | | X |
| X | | X | X | 7 | | X | | | X |
| X | X | | | 8 | | | X | | X |
| X | X | | X | 9 | | | | X | X |
| | | | | 0 | | X | X | | |

3,234,366
Patented Feb. 8, 1966

1

3,234,366

DIVIDER UTILIZING MULTIPLES OF A DIVISOR

Claud M. Davis, Poughkeepsie, and John A. De Veer, Millbrook, N.Y., assignors to International Business Machines Corporation, New York, N.Y., a corporation of New York Filed Nov. 15, 1961, Ser. No. 152,391
10 Claims. (Cl. 235—156)

Figure 1:
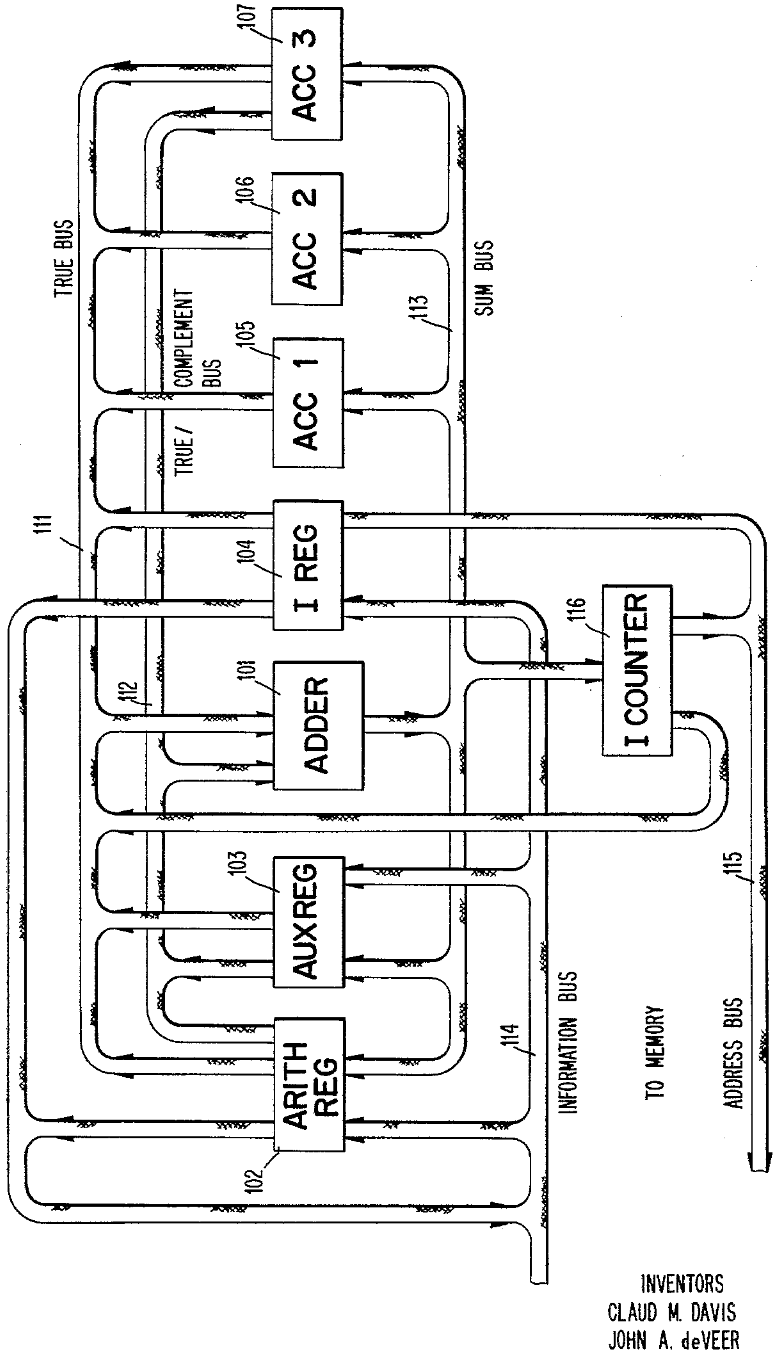

This invention relates to digital computers and particularly to a non-restoring divider which operates by programmed subtraction in parallel of multiples of the entire divisor from the entire dividend remainder.

A set of divisor multiples is first generated. These multiples of the divisor are then subtracted from the dividend remainder according to a fixed format to develop the quotient digit. Carry look-ahead signals developed by the subtracter are used to prevent gating of the result of the subtraction at the last instant in situations where subtraction of the multiple would cause the dividend remainder to go below zero. Such subtractions are aborted; the dividend remainder is not changed as a result of the attempted subtraction and there thus is no need for a restoring cycle.

PRIOR KNOWLEDGE

Digital dividers in the prior art generally operate by successive subtractions of the divisor from the dividend remainder with each quotient digit being developed by counting the number of successful subtractions. Depending on what happens when the successive subtractions carry the dividend remainder below zero such dividers are classified as either "restoring" or non-restoring." Restoring dividers generally allow successive subtractions to carry the dividend remainder below zero. They then go through a restoring cycle to add the divisor back and thus restore the dividend remainder to a positive value. After restoring, the dividend remainder is shifted and further successive subtractions are attempted.

Non-restoring parallel dividers generally operate by successive subtraction until the dividend remainder is carried below zero followed by successive additions of the divisor for the next quotient digit until the dividend remainder goes above zero. Thus alternate quotient digits are developed by successive subtractions and successive additions.

Carry look-ahead adders of various types have become well known. Because in multi-digit parallel addition the elapsed time inherent in a ripple carry from low order to high order is significant with respect to the addition proper, various techniques have been utilized to predict (look ahead for) the carry. Application Serial Number 107,405, filed May 3, 1961, John M. Pugmire, Adder, assigned to the assignee hereof, discloses such a look-ahead carry parallel adder. The preferred embodiment is built of AND-INVERTER transistor circuits and operates in a weighted 2/5 code. Each decimal digit 1–9 is made up of two-out-of-five possible bit weights 0–1–2–3–6. The decimal 0 is made of bit weights 1–2 and is contrary to bit weighting theory.

A look-ahead carry parallel adder generally operates as in the following examples. Each digit of the addend and each digit of the augend are aligned and combined, carries being disregarded.

```
    6 7 8 9 0 1 2 3 4 5  Augend
    5 6 7 8 9 0 1 2 3 4  Addend
    ---------------------------
    1 3 5 7 9 1 3 5 7 9  Raw Sum
```

Carries are appropriate in each of the high four orders.

2

```
    6 7 8 9 0 1 2 3 4 5  Augend
    5 6 7 8 9 0 1 2 3 4  Addend
    ---------------------------
    1 3 5 7 9 1 3 5 7 9  Raw Sum
(1) 1 1 1                Carries
    ---------------------------
(1) 2 4 6 7 9 1 3 5 7 9  Final Sum
```

Each carry above is "generated," since it is produced by an addition which surpasses 10. Carry generate terms can be decoded simply, especially in weighted codes. In (0 1 2 3 6) 2/5 code, for example, any addition of two numbers each having a 6-bit generates a carry.

It is possible for a raw sum digit 9 to be altered to 10 (0 plus carry) as a result of a carry from the previous order. This carry is "propagated." In an adder without carrylook-ahead, carry propagation is by "ripple."

```
    5 5 5 5 5 5 5 5 5 5  Augend
    4 4 4 4 4 4 4 4 4 7  Addend
    ---------------------------
    9 9 9 9 9 9 9 9 9 2  Raw Sum
                    1    Generated Carry
    ---------------------------
    9 9 9 9 9 9 9 9 0 2  Addition of Generated
                  1      Carry
    ---------------------------
    9 9 9 9 9 9 9 0 0 2  First Ripple
                1        Propagate
    ---------------------------
    9 9 9 9 9 9 0 0 0 2  Second Ripple
              1          Propagate
    ---------------------------
    9 9 9 9 9 0 0 0 0 2  Third Ripple
            1            Propagate
    ---------------------------
    9 9 9 9 0 0 0 0 0 2  Fourth Ripple
          1              Propagate
    ---------------------------
    9 9 9 0 0 0 0 0 0 2  Fifth Ripple
        1                Propagate
    ---------------------------
    9 9 0 0 0 0 0 0 0 2  Sixth Ripple
      1                  Propagate
    ---------------------------
    9 0 0 0 0 0 0 0 0 2  Seventh Ripple
    1                    Propagate
    ---------------------------
    0 0 0 0 0 0 0 0 0 2  Eighth Ripple
(1)                      Propagate
    ---------------------------
(1) 0 0 0 0 0 0 0 0 0 2  Final Sum
```

Carry look-ahead, however, decodes all carry generate and propagate situations on a digit basis as follows:

```
5 5 5 5 5 5 5 5 5 5                5 5 5 5 5 5 5 5 5 5
4 4 4 4 4 4 4 4 4 7                4 4 4 4 4 4 4 4 4 7
-------------------                -------------------
P P P P P P P P P G       Raw Sum  9 9 9 9 9 9 9 9 9 2
```

So long as there is a G to the right, and an unbroken series of P's intervening, a carry 1 is introduced for each P and each G, offset one position leftward. This requires somewhat complex multi-digit logic, since a G at far right can affect a P at far left.

```
    P P P P P P P P P G  Propagates and Generate
(1) 1 1 1 1 1 1 1 1 1 1  Carries (high order carry)
```

The carry 1's from carry look-ahead alter the raw sum (carries being disregarded) to produce the final sum.

```
    9 9 9 9 9 9 9 9 9 2  Raw Sum
(1) 1 1 1 1 1 1 1 1 1    Carries
    ---------------------------
(1) 0 0 0 0 0 0 0 0 0 2  Final Sum
```

A look-ahead carry parallel adder is a building-block of this invention; details of the adder itself are however not a part of this invention.

It is to be expected in computer division problems, especially in fixed-word-length machines, that there will be an appreciable number of high order dividend and quotient 0's. Prior art dividers operate by decoding high order dividend and divisor digits according to fixed formulas to predict high order quotient 0's. Such dividers cannot predict the high order quotient 0 digit which occurs when a small significant dividend digit is divided by a larger significant divisor digit. If there are three dividend 0's and one divisor 0, two quotient Ø's are predicted. This type of quotient prediction works well in this example:

```
       Ø.Ø20   Ø=predicted 0
.044 ) .000380
```

Quotient prediction misses one Ø in this case:

```
       Ø.Ø05
.088 ) .000440
```

Objects of the invention are:

(1) Utilization of the carry look-ahead provision of a parallel digital adder to remove the necessity for restoring.

(2) Subtraction of stored multiples to divide by selected subtractions of stored divisor multiples using carry look-ahead to determine the sequence of subtraction.

(3) Development of high order quotient 0's by a parallel subtraction of the divisor ×1 multiple and a shifting for each high order quotient 0 until a carry look-ahead signal indicates that the first significant quotient digit has been reached.

*Summary*

The divider operates according to a program unit. The program unit initially develops the ×1, ×2 and ×4 multiples of the entire divisor which are retained in quick-access registers. The terms "×1, ×2 and× 4 multiples" means the values obtained by multiplying the divisor by 1, 2 and 4 respectively. The dividend is placed in two adjacent quick-access registers which are coupled together for shifting. After termination of the divide operation, the quotient will have replaced the low order dividend register contents and the remainder will remain in the high order dividend register.

High order 0's are to be expected in most division situations. A special subtraction of the divisor ×1 multiple is made for each high order quotient 0; when the ×1 multiple subtraction causes the remainder to go below 0, a significant quotient digit trigger is set and division in earnest begins. During the search for the highest significant quotient digit, no actual subtraction takes place but rather subtraction results are predicted by carry look-ahead circuits of the adder. The dividend registers, just after the significant digit trigger is set, retain the dividend in its initial form.

To develop each quotient digit, except the high order 0's, a standard subtraction format is followed. The ×4 multiple is first subtracted and the carry out signal examined. If the subtraction of the ×4 multiple is to result in a negative remainder, no carry out signal occurs and the subtraction is aborted. The subtraction operation actually occurs, but the adder output gate is not operated so that the dividend remainder is not altered by the particular subtraction.

If subtraction of the ×4 multiple leaves a positive remainder, a second subtraction of the ×4 multiple is attempted. The second subtraction of the ×4 multiple is successful only if the quotient digit being developed has a value of 8 or 9. If the subtraction is to result in a negative remainder, no carry out signal occurs and the subtraction is aborted. This occurs if the quotient digit being developed has a value of 5, 6 or 7.

If the first subtraction of the divisor ×4 multiple is not successful, it is useless to attempt the second subtraction of the ×4 multiple, since anything which is less than 4 is also less than 8 or 9. Accordingly the second subtraction of the ×4 multiple is omitted in those cases where the first ×4 subtraction is unsuccessful.

The next subtraction possibility is the divisor ×2 multiple. This is attempted in all cases except where the divisor ×4 multiple has been successfully subtracted twice. Two successful subtractions of the ×4 multiple occur only if the quotient digit being developed has a value of 8 or 9. These two successful subtractions of the ×4 multiple together provide a weight of 8. Addition of a weight 2 to the weight 4+4 would exceed the decimal radix; therefore the ×2 subtraction is not attempted. For all other situations, that is, where the quotient digit being developed has a value from 0–7, the divisor ×2 multiple is subtracted as a matter of course.

The divisor ×1 multiple subtraction is attempted last in all cases.

The carry out signal from the carry look-ahead section of the adder indicates whether the subtraction is to be successful or not. If the subtraction is not to be successful, the subtraction is aborted. There is never any need for restoring the dividend remainder to a positive value nor of bouncing between subtraction and addition steps as in prior non-restoring divisors. The carry look-ahead carry out signal controls gating of the subtraction result and also controls setting of the particular bit trigger in the single digit quotient register. This single digit quotient register will be hereinafter referred to as the MQ register. The MQ register is in 4421 code to match the 421 multiples, even though the rest of the computer is in 2/5 code. After the divisor ×1 multiple has been subtracted, whether successfully or unsuccessfully, the quotient digit is translated from 4421 to 2/5 code and fed to the low order position of accumulator 2. A coupled left shift then places the new dividend remainder high order digits in position for subtraction of divisor multiples from accumulator 1 and moves the quotient digit just generated into the low order position of accumulator 2. As further quotient digits are developed, they too are shifted into the low order position of accumulator 2 until at termination of the division the quotient word appears in accumulator 2 and the remainder in accumulator 1.

Features of the invention are:

(1) Mechanism to perform selective subtraction of divisor ×1, ×2, and ×4 multiples according to ×4A, ×4B, ×2, ×1 sequence with elimination of the ×4B and ×2 subtraction in situations where such subtractions are redundant.

(2) Mechanism to subtract the divisor ×1 multiple from the dividend reaminder for each high order with a shift following such subtraction until a look-ahead carry out signal indicates a high order significant quotient digit whereupon a significant digit trigger is set and the high order subtraction ×1H is discontinued.

(3) Mechanism to subtract divisor ×4A, ×4B, ×2 and ×1 multiples in 2/5 code in parallel from the dividend remainder in 2/5 code and develop a quotient digit in 4421 code corresponding to the divisor multiples, and mechanism to translate the quotient digit to 2/5 code for storage.

(4) Mechanism to perform subtraction of divisor multiples from a dividend remainder in an adder having look-ahead carry provisions, with accumulation subject to the carry signal so that overdraft subtractions are aborted by lack of gating, while non-overdraft subtractions are gated for accumulation. The carry signal operates the adder output gate directly during division in earnest.

Advantages of the invention are:

(1) Division becomes completely compatible with multiplication by accumulation of ×4, ×2 and ×1 multiples according to a 4421 coded MQ even though the basic arithmetic unit operates in 2/5 code.

(2) All high order quotient 0's are developed by shortcut methods.

(3) There is no restoring problem, since subtractions which otherwise would carry the dividend remainder below zero (and thus require restoring) are aborted under control of carry look-ahead.

The foregoing and other objects, features and advantages of the invention will be apparent from the following more particular description of a preferred embodiment as illustrated in the drawings.

Drawings are as follows:

FIGURE 1—COMPUTER—a functional block diagram of a data processing system in which the invention operates.

Figure 2:
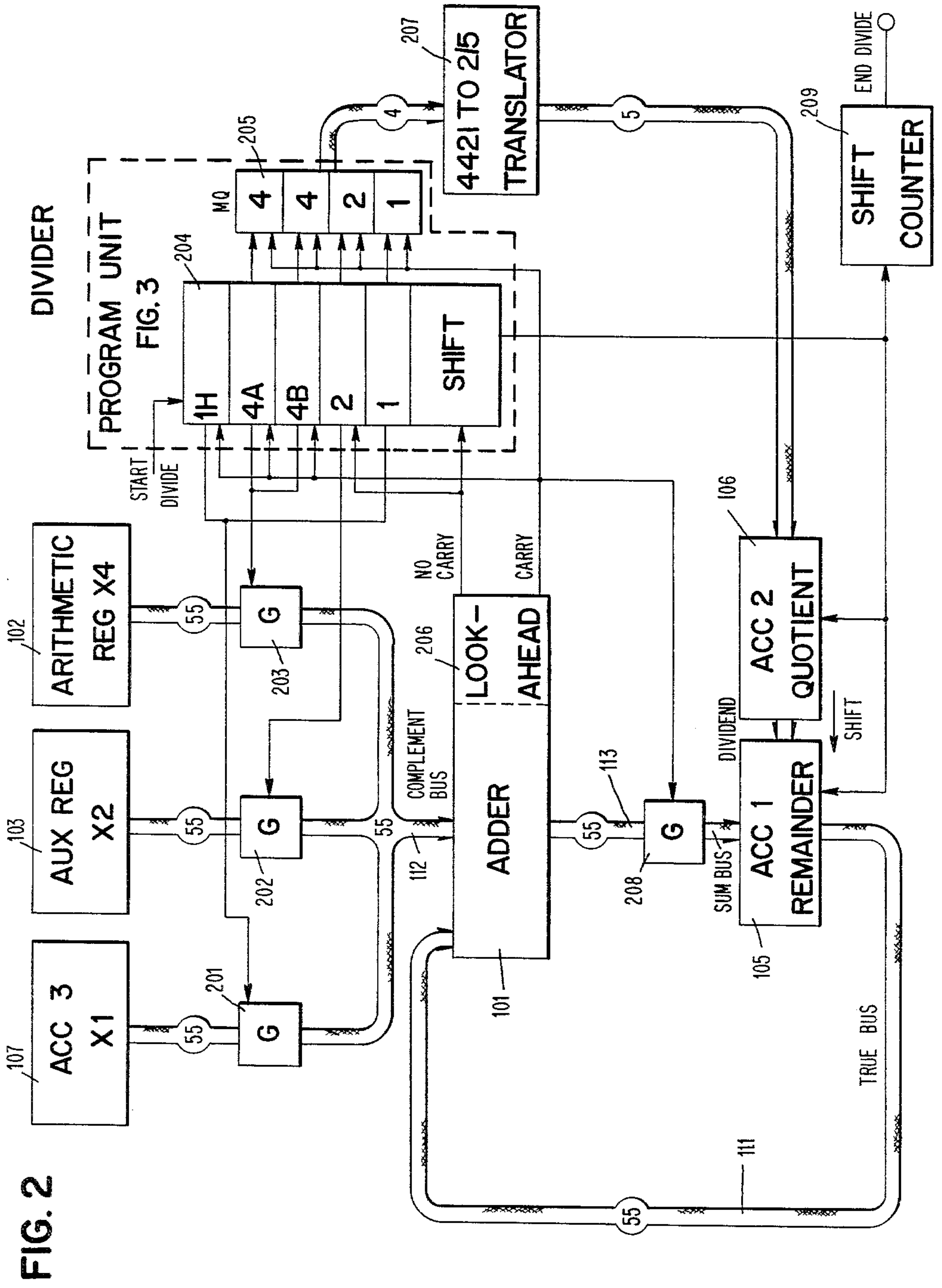

FIGURE 2—DIVIDER—a functional block diagram of the divide mechanism.

Figure 3:
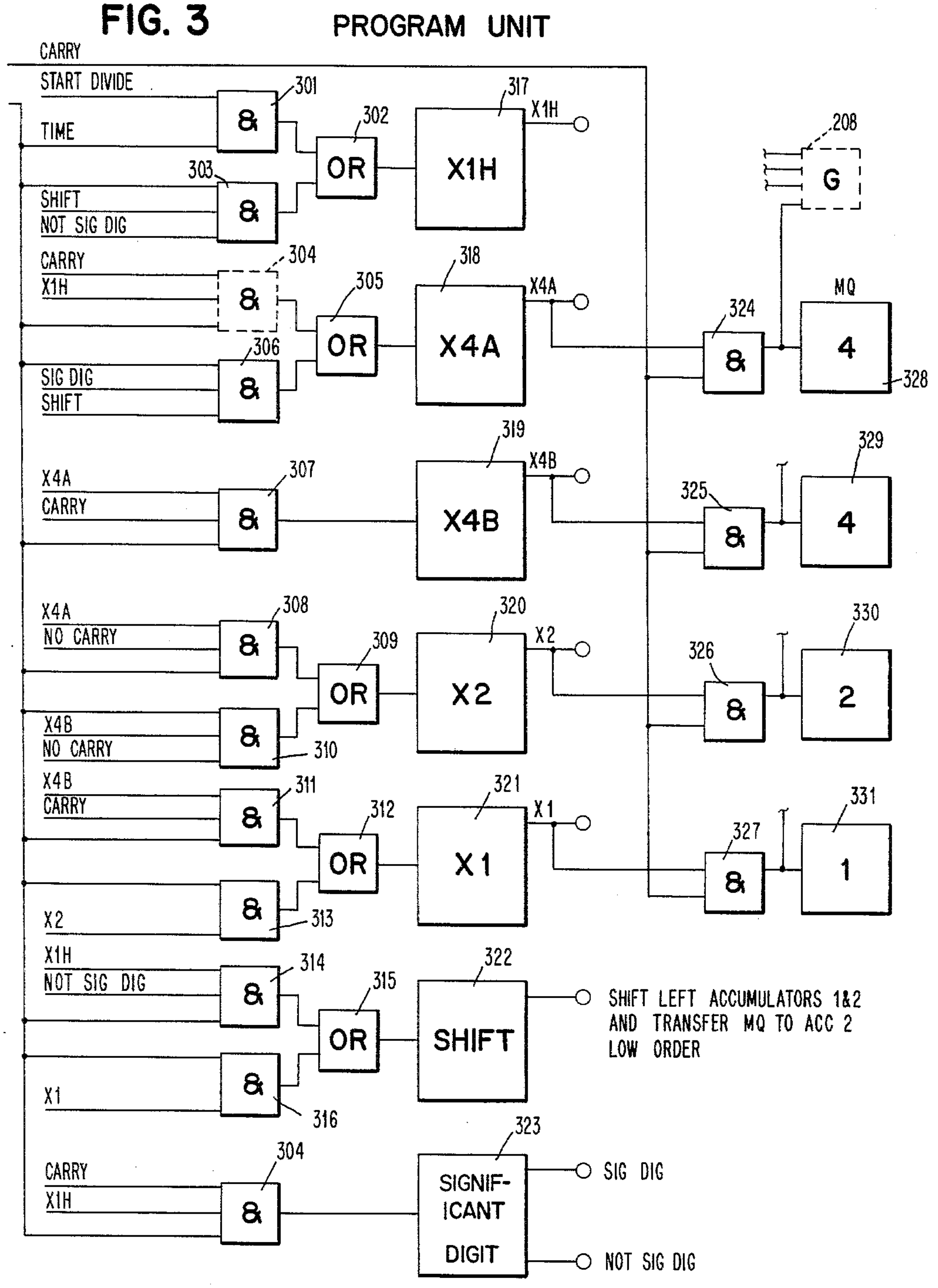

FIGURE 3—PROGRAM UNIT—a circuit block diagram of the divide controls.

Figures 4, 5:
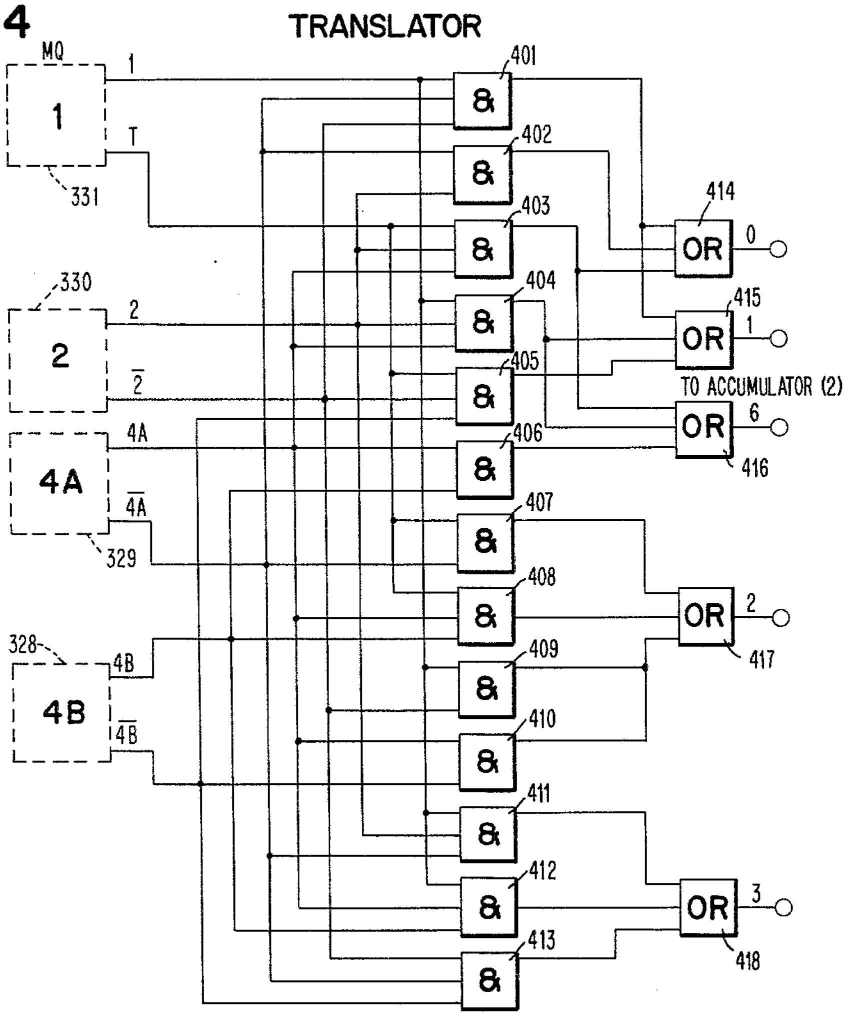

FIGURE 4—TRANSLATOR—a circuit block diagram of the 4421 to 2/5 translator (block 207 of FIGURE 2.)

FIGURE 5—CODES—code charts.

*FIGURE 1—Computer*

Adder 101 is the basic arithmetic unit for the divide operation. Registers 102–107 provide necessary instruction, result and operand storage. Registers 102–107 are connected directly to various full-word buses 111–114. Address bus 115 and instruction counter 116 provide basic operation control. The registers are named as follows:

| | |
|---|---|
| Arithmetic register | **102** |
| Auxiliary register | **103** |
| Instruction register | **104** |
| Accumulator (1) | **105** |
| Accumulator (2) | **106** |
| Accumulator (3) | **107** |

Each register connects to other registers and to adder 101 via appropriate buses.

The ordinary divide operation involves all registers and all buses. The word size for each register and for the adder is nominally 10 digits. Because of possible high order carries and necessities for other operations, most registers and the adder are capable of operating with 11 digit words by using a special high order position. allel adder of sufficient speed and accuracy. A application addition to itself in adder 101 the divisor ×2 multiple is developed and stored in auxiliary register 103. The ×2 multiple content of auxiliary register 103 is then added to the ×1 divisor multiple content of accumulator (3) 107 to produe the ×3 divisor multiple which is merely an intermediary. The ×1 divisor multiple content of accumulator (3) is then added to the ×3 divisor multiple and the resulting ×4 divisor multiple is set into arithmetic register 102. The two-word dividend is set into accumulator (1) 105 and accumulator (2) 106 which may be considered as coupled together.

At the conclusion of setup for the divide operation, the register contents are as follows:

| | |
|---|---|
| Accumulator (3) **107** | Divisor ×1. |
| Auxiliary register **103** | Divisor ×2. |
| Arithmetic register **102** | Divisor ×4. |
| Accumulator (1) **105** | Dividend high order. |
| Accumulator (2) **106** | Dividend low order. |

The adder may be any form of look-ahead carry parallel adder of sufficient speed and accuracy. Application Serial Number 107,405 filed May 3, 1961, John M. Pugmire, Adder, assignee IBM, discloses a preferred choice. The adder includes complement mechanism associated with true-complement bus 112 which allows the adder the adder to function as a subtracter. The sum (algebraic sum or subtraction difference) is developed in parallel and gated out on to sum bus 113. The sum includes the effects of parallel carry look-ahead so that there is no carry ripple. Carry look-ahead carry signals from the high order of the adder are available concurrently with the sum. These carry look-ahead signals are used to gate the sum onto sum bus 113 or abort the subtraction by failing to gate the sum onto sum bus 113.

Instruction register 104 holds the particular instruction being processed, in this situation DIVIDE. This is decoded by suitable operation decoders to produce a signal START DIVIDE. Instruction counter 116 holds the address of the next instruction.

*FIGURE 2—Divider*

The ×1, ×2 and ×4 divisor multiples are contained in accumulator (3) 107, auxiliary register 103 and arithmetic register 102 respectively. Each of these registers connects via its associated gate 201, 202 or 203 to adder 101. Program unit 204 controls gates 201–203 to selectively gate ×1, ×2, or ×4 divisor multiples to adder 101 via complement bus 112. During division, the adder 101 always functions as a subtracter and true complement bus 112 always functions as a complement bus. The high order word of the dividend is stored in acumulator (1) 105. This passes via true bus 111 directly to adder 101. Program unit 204 controls gate 201 to subtract the ×1 divisor multiple from the dividend high order position to develop high order quotient 0's. So long as the high order dividend word is smaller than the ×1 multiple, quotient 0's are developed without alteration of the dividend since each subtract cycle is aborted by failure to operate adder output gate 208. Program unit 204, after each aborted high order quotient 0×1 divisor multiple subtraction causes a left shift of the dividend (accumulators (1) and (2), 105–106) and entry of a quotient high order 0 digit into the low order position of accumulator (2). As the divide operation proceeds, the dividend remainder shifts into accumulator (1) and the quotient fills accumulator (2). At the termination of the divide operation, the quotient appears in accumulator (2) and the remainder in accumulator (1).

As soon as the first non-zero quotient digit is detected by a carry out from the carry look-ahead during the ×1H subtraction of the ×1 divisor multiple, program unit 204 ceases to try the ×1H subtraction and settles down to the standard divide operation. Special provision must be made to abort the ×1H subtraction which finally sets the high order quotient significant digit trigger. Gating for this function is explained in connection with FIGURE 3.

Each quotient digit other than high order quotient 0's is developed by selective sequential subtractions of the ×4, ×2 and ×1 divisor multiples. MQ 205 comprises four single bit triggers with weights 4, 4, 2 and 1. Various combinations of these bit weights provide for each decimal digit 0–9. Program unit 204 controls the ×1H subtraction during high order quotient 0 development and subtractions 4A, 4B, 2, and 1 during divide proper. In certain situations (where quotient digits are to be 0–3) program step 4B is omitted. Where the quotient digit is to be 8 or 9, program step 2 is omitted. No extra subtract operations are performed where carry look-ahead signals show their redundancy (for quotient digits 0–3, 8 and 9).

Each quotient digit and the subtraction cycles necessary to develop it are shown in the following chart:

| Quotient digit | ×4A | ×4B | ×2 | ×1 |
|---|---|---|---|---|
| 9 | 1 | 1 | - | 1 |
| 8 | 1 | 1 | - | 0 |
| 7 | 1 | 0 | 1 | 1 |
| 6 | 1 | 0 | 1 | 0 |
| 5 | 1 | 0 | 0 | 1 |
| 4 | 1 | 0 | 0 | 0 |
| 3 | 0 | - | 1 | 1 |
| 2 | 0 | - | 1 | 0 |
| 1 | 0 | - | 0 | 1 |
| 0 | 0 | - | 0 | 0 |

As each subtract cycle is taken, the carry look-ahead section 206 of adder 101 produces either a high order signal CARRY or a high order signal NO CARRY. CARRY indicates that the result of the subtract cycle is to be a positive remainder or zero. NO CARRY indicates that the result of the subtraction is to be a negative remainder, which is contrary to the rules for this divider. CARRY operates gate 208 and the subtraction is said to be successful. CARRY also sets the appropriate MQ bit trigger. Where the signal CARRY does not develop, gate 208 remains closed, the dividend remainder in accumulator (1) is not altered and the MQ bit trigger is not set. The subtraction actually occurs within adder 101 but is aborted by failure to gate the result to accumulator (1) 105.

Program unit 204 thus controls up to four subtraction operations 4A, 4B, 2 and 1 for each quotient digit, during which MQ 205 triggers are set to the appropriate digit value 0–9. After the ×1 divisor multiple subtraction, the program unit causes a shift of coupled accumulators (1) and (2) 105–106. This shift includes entry of the quotient digit sum from MQ 205 via 4421 to 2/5 translator 207 into the low order digit position of accumulator (2) 106.

The MQ register is most effectively arranged to match the multiples used during multiply and divide; its 4421 bit values can thus be directly developed during subtraction cycles. The rest of the computer however operates in 2/5 code.

*FIGURE 3—program unit*

The divide controls include input logic blocks 301–316, program triggers 317–322, significant digit trigger 323, MQ input logic 324–327 and MQ trigger 328–331. CARRY, NO CARRY, TIME and START DIVIDE signals are basic inputs. The TIME signal is an input to each AND circuit in the input logic, providing for synchronous operation. The START DIVIDE signal coincident with a TIME signal conditions A-block 301 to set ×1H trigger 317 via OR circuit 302. Thus at the very start of divide, the program unit is set up to attempt the ×1H subtraction as a search for high order quotient 0. The ×1H trigger provides gating of the ×1 multiple from accumulator (3) 107 via gate 201 in FIGURE 2. The MQ, at this time, is not subject to alteration and is in a reset condition in response to read out and reset means not shown. The start divide signal subsides immediately and does not reappear during the divide operation.

The ×1H trigger conditions A-block 304 to accept a CARRY signal to set significant digit trigger 323.

The high order quotient 0 results from a subtraction of the ×1 divisor multiple from a portion of the dividend which is of less absolute value than divisor ×1. For example, assume a dividend high order of 00444 and divisor ×1 multiple 00555. The subtraction by complement addition is as follows:

| | |
|---|---|
| Dividend | 00444 |
| 9's Complement divisor ×1 | 99444 |
| Fugitive 1 | 1 |
| No Carry | 0 99889 |

The system organization of FIGURE 2 shows that the 0 value of MQ 205 is translated to 2/5 code in translator 207 and is set into the low order digit position of accumulator (2) 106. In FIGURE 3, shift trigger 322 and input A-block 314 control this function. A-block 314 is conditioned by coincident signals TIME, ×1H and NOT SIG DIG. Shift trigger 322, set by A-block 314 via O-block 315, controls the shift left of accumulators 1 and 2 and a transfer of MQ content (0 at this time) to accumulator to low order. FIGURE 4 illustrates how the translator 207 responds to the reset state of the several MQ triggers 328, 329, 330 and 331 to produce a 2/5 representation of the value 0.

It is now time to try another ×1H subtraction to look for a second high order quotient 0. The start divide signal has subsided. A-block 303, however, is conditioned by coincident signals TIME, SHIFT, and NOT SIG DIG to set ×1H trigger 317 via O-block 302. If this quotient digit is also to be a 0, there is no look-ahead signal CARRY and significant digit trigger 323 remains unset. Similarly to the operation for the first high order quotient 0, shift trigger 322 is set. Shift trigger 322 controls its shift and transfer functions and causes ×1H trigger 317 to be set for another try.

Eventually a string of the high order quotient 0's is followed by a significant quotient digit. If the dividend remainder high order portion has been shifted to be higher in absolute value than the divisor ×1 multiple, a significant quotient digit is predicted by carry look-ahead. A-block 304 is set by coincident signals CARRY, ×1H and TIME to set significant digit trigger 323. There is no circuit to set shift trigger 322, no circuit to set ×1H trigger 317, and no circuit to set any trigger 328–331 of the MQ. The ×1H program step is eliminated from further processing of the divide instruction. Because the ×1H operation is distinct in time from other operations, the ×1H trigger may be effectively time-shared for use in other operations such as multiply.

A-block 304 is conditioned by coincident signals CARRY, ×1H, and TIME to set significant digit trigger 323. A-block 304 is shown dotted in the input to program trigger ×4A 318, to avoid confusion in the drawing. The output of A-block 304 passes via O-block 305 to set ×4A trigger 319 and begin the division in earnest. A-block 304 is not used further during division.

Program trigger ×4A 318 controls subtraction of the divisor ×4 multiple from the dividend. During all the search for high order quotient 0's, gate 208 in FIGURE 2 never is conditioned to allow the subtraction to alter the dividend. Each ×1H subtraction is aborted by failure to condition gate 208. Gate 208 is operated by the output of A-block 324 (during other program cycles by the output of A-blocks 325–327) in response to coincident signals ×4A (×4B, ×2, ×1) and CARRY. The same signal which operates gate 208 to allow the subtraction sets the associated MQ bit trigger, which for the ×4A program step, is bit trigger 328.

If the ×4A subtraction is successful, MQ bit trigger 328 is set, the dividend has been altered and is now a remainder, and it is time to attempt the ×4B subtraction.

A-block 307 is conditioned by coincident signals ×4A, CARRY, and TIME to set program trigger ×4B 319 which controls the second subtraction of the ×4 multiple by operating gate 203. Outputs of program triggers ×4A 318 and ×4B 319 can be combined by a logical OR circuit not shown to operate gate 203 if gate 203 is the usual array of AND circuits. It is implicit in the single control of the ×4B trigger that it follow a successful ×4A subtraction since the signal CARRY is a required input to A-block 307 along with ×4A. Accordingly the ×4B program step is omitted where the ×4A subtraction is unsuccessful.

Input A-block 308 is conditioned by coincident signals ×4A, NO CARRY and TIME to set program trigger ×2 320 via O-block 309 in those situations where the quotient digit is to be 0, 1, 2, or 3. Program trigger ×2 230 controls ×2 divisor multiple gate 202 and conditions A-block 326. If the ×2 multiple subtraction is to be successful, a look-ahead signal CARRY completes conditioning of A-block 326 to operate gate 208 and to set MQ bit 2 trigger 330. If the ×2 subtraction is not to be successful, no look-ahead signal CARRY appears, the subtraction is aborted by failure to operate gate 208 and MQ bit 2 trigger 330 is not set.

For instances where the ×4B subtraction is carried out but is unsuccessful, program trigger ×2 320 is to be operated, i.e., for quotient digits 4, 5, 6, and 7. A-block 310 is conditioned by coincident signals TIME, ×4B and NO CARRY to st program trigger ×2 320 in such instances and thus control the ×2 subtraction step. Where both the ×4A and ×4B subtractions are successful, NO CARRY look-ahead signal appears and the ×2 multiple subtraction step is thus omitted where quotient digits are to be 8 or 9.

The ×1 subtraction is always taken during division in earnest. Since the ×4B step, if successful, causes elimination of the ×2 step, the ×1 subtraction can follow the ×4B subtraction. A-block 311 is conditioned by coincident signals ×4B, CARRY and TIME to condition via O-block 312 program trigger ×1 321 to take the ×1 multiple subtraction step. If this step is successful as indicated by a look-ahead signal CARRY, A-block 327 is conditioned to operate gate 208 and to set MQ bit 1 trigger 331. if the ×1 subtraction is not successful, of course, the signal CARRY fails to appear, the subtraction is aborted by failure to operate gate 208 and MQ bit 1 trigger 331 remains unset.

In instances where the ×2 subtraction is attempted, the ×1 step simply follows the ×2 step. A-block 313 is conditioned by coincident signals TIME and ×2 to set program trigger ×1 321 to attempt the ×1 subtraction.

At this point, the MQ bit triggers hold the quotient digit in 4421 code. It is necessary to shift the remainder and quotient, convert the quotient digit to 2/5 code and enter the quotient digit into accumulator 2 (see FIGURE 2). Accordingly, setting of the shift trigger 322 follows the ×1 subtraction step as a matter of course. In FIGURE 3, A-block 316 responds to coincident signals TIME and ×1 to set shift trigger 322 via O-block 315. Shift trigger 322 controls the shift and setting of the quotient digit, and returns control to ×4A trigger 318.

*End Divide—See FIGURE 2*

The preferred embodiment is a fixed word length (10-digit) device; division is complete after ten shifts. The END DIVIDE signal is conveniently developed by shift counter 209 which is set to 10 at START DIVIDE time and decremented with each shift. When the shift counter reaches zero, it produces the end divide signal.

*FIGURE 4—Translator*

The translator accepts 4421 bit inputs from MQ triggers 328–331 (shown in broken lines since they also appear in FIGURE 3) and produces bit outputs in (0–1–2–3–6) 2/5 code which are available to accumulator (2) 106 in FIGURE 2. Thirteen AND circuits 401–413 decode 4421 situations in which particular 2/5 bits are to appear. The AND circuits feed encoding OR circuits 414–418 which produce the 2/5 coded bit outputs.

*FIGURE 5—Codes*

The charts show the bit structure of 4421 decimal code and the bit structure of (0–1–2–3–6) 2/5 code with the decimal equivalent.

*Components*

In FIGURE 2, registers 107, 103 and 102 may be any registers having binary storage capacity, which are capable of parallel readout. Accumulators (1) and (2) are side-entry shift registers, which can accept data in parallel from a bus (side-entry) or serially shift data digits (including an entry digit) one digit position letfward upon a shift command.

Bevitt, Transistors Handbooks, Prentice-Hall, Englewood Cliffs, New Jersey, 1956, explains the philosophy of shift registers in chapter 20.

Translator 207 may be any suitable diode or transistor logical matrix or other fixed code translator which accepts inputs including decimal values 0–9 in 4421 code and provides outputs in 2/5 code. Richards, Arithmetic Operations in Digital Computers, Van Nostrand Company, New York, 1955, explains the philosophy of such matrices on pages 71–77.

Program triggers 317–322 may be any suitable bistable devices settable by an input signal of the type developed by logical AND and OR circuits. The program triggers can most effectively function if they are reset by the TIME signals so that the duration of each is one time period, although single shot triggers could also be effective.

Significant digit trigger 323 may be any set-reset type trigger settable by the output of a logical AND circuit and resettable by separate means not shown prior to the start of the next divide operation.

MQ triggers 328–331 similarly may be any set-reset triggers settable by the output of logical AND circuits and resettable by separate means not shown prior to the start of the next divide operation, and as a part of each shift operation.

Program triggers 317–322, significant digit trigger 323, and MQ triggers 328–331 are all assumed to be in the reset condition at the start of the divide operation. This can be accomplished in several ways such as connecting the signal START DIVIDE to all of them (differentiating the reset pulse to ×1H trigger 317 or making other provision for allowing it to be set immediately).

Triggers are disclosed in various publications including Bevitt and Richards.

Shift counter 209 can be any suitable presettable countdown device. Richards discloses such counters in chapter 7, pages 193–208.

*Final summary (see FIGURES 2–3)*

Divisor multiples ×1, ×2 and ×4 are initially stored in registers 107, 103, and 102; the dividend in coupled shift registers 105, 106. After the divide operation the quotient appears in register 106 and the remainder in register 105. Program unit 204 controls subtraction of divisor multiples from the dividend remainder by selectively operating gates 201–203 which control complement inputs to added 101 via bus 112. The high order portion of the dividend from register 105 is a true input bus 111 to adder 101. To develop high order quotient 0's, program unit 204 first controls gate 201 for a subtraction of the ×1 multiple. Adder 101 includes look-ahead mechanism 206 which produces a signal NO CARRY when the divisor multiple is subtracted from a larger dividend value. This controls a shift of the dividend in registers 105, 106 and insertion of a 0 quotient at the low order of register 106. After the shift the ×1 divisor multiple is subtracted again, carry look-ahead 206 produces a no carry signal and another shift occurs until occurrence of the first significant quotient digit is recognized by a signal CARRY.

Program unit 204 begins division in earnest. Divisor multiples ×4, ×4A, ×4B, ×2 and ×1 are complement gated via respective gates 203, 202, and 201 for each subsequent quotient digit. MQ 205 triggers 4, 4, 2 and 1 are set only upon occurrence of a carry during subtraction of the related multiple. The resulting quotient digit is coded in 4421 code although the remainder of the computer is coded in 2/5 code. CARRY look-ahead mechanism 206 indicates that subtraction of the particular multiple has been successful by producing the signal CARRY, since complement addition produces a carry if the end result is to be positive. The signal CARRY gates the result of successful subtractions through gate 208 to the remainder register 105. Unsuccessful subtractions are aborted by failure to operate gate 208. The quotient digit, developed in MQ 205 in 4421 code, is converted to 2/5 code by translator 207 prior to storage in the quotient register 106.

The invention has been particularly shown and described with reference to a preferred embodiment. It will be understood by those skilled in the art that the foregoing and other changes in form and details may be made without departing from the spirit and scope of the invention.

What is claimed is:

1. A divider which operates by subtractions of divisor multiples from a dividend remainder, each represented by digits in a first code, comprising:

(a) ×1, ×2, and ×4 divisor multiple registers for holding first, second and third multiples of the divisor equal, respectively, to the divisor multiplied by 1, 2 and 4;

(b) first and second shiftable accumulator registers each having a high order end and a low order end for initially holding the dividend and for receiving the dividend remainder and the quotient, respectively, during the divide operation;

(c) shift control means coupled to said accumulator registers to enter a quotient digit at the low order end of said second accumulator register and to shift the contents of said first and second accumulator registers by one digit position accordingly, in such a manner that the digit shifting out the high order end of said second accumulator register enters the low order end of said first accumulator register;

(d) single subtracting means having an input and an output and including means for signalling the presence or absence of an overdraft produced by a current subtraction;

(e) means connecting said first accumulator register to one input of said subtracting means and said ×1, ×2, and ×4 multiple registers selectively as inputs to another input of said subtracting means;

(f) means connecting said output of said subtracting means to said first accumulator register;

(g) program means operative during development of each quotient digit coupled to said divisor multiple registers (b) and said accumulators (b) for controlling selective subtractions through said subtracting means of the contents of selected ones of said divisor multiple registers in sequence beginning with said ×4 multiple register from the contents of said first accumulator register to produce a remainder value;

(h) a single digit quotient register having bit triggers in 4421 code in such fashion that addition of weights produce each of the possible quotient digits 0–9 in 4421 code;

(i) quotient bit trigger setting means coupled to said quotient register and to said means for signalling the presence or absence of an overdraft for setting the bit triggers of said quotient register in accordance with the presence or absence of an overdraft produced by the subtraction of the related divisor multiple;

(j) translating means coupled to said quotient register for translating the 4421 code representation of a quotient digit into said first code; and (k) quotient storage and shift control means to cause storage of the developed quotient digit in the low order position of said second accumulator by transferring the content of said quotient register via said code translator to the low order position of said second accumulator and by coupled shifting the contents of said first and second accumulators, whereby at termination of the divide operation the quotient appears in said first accumulator and the remainder in said second accumulator.

2. The invention defined in claim 1 wherein the program means includes:

(l) means for causing a first subtraction of the ×4 divisor multiple;

(m) means responsive to an overdraft produced by said first subtraction for causing a next subtraction of the ×2 divisor multiple;

(n) means responsive to absence of an overdraft produced by said first subtraction for causing a next subtraction of said ×4 divisor multiple;

(o) means responsive to an overdraft produced by a second subtraction of the ×4 divisor multiple for causing a next subtraction of the ×2 divisor multiple;

(p) means responsive to absence of an overdraft produced by a second subtraction of the ×4 divisor multiple for causing a next subtraction of the ×1 divisor multiple; and (q) means responsive to subtraction of the ×2 divisor multiple for causing a next subtraction of the ×1 divisor multiple.

3. In a divider for a digital computer, the combination of:

(a) a plurality of divisor multiple registers each for holding a different selected multiple of a divisor;

(b) an accumulator register for holding a dividend remainder;

(c) single subtracting means including overdraft means for signalling the presence or absence of an overdraft produced by a current subtraction;

(d) means selectively connecting each divisor registers to one input of said subtracting means and the accumulator register as another input to the subtracting means;

(e) gating means connecting the output of said subtracting means to said accumulator register;

(f) means operative during development of each quotient digit for controlling the subtracting means to perform successive subtractions of selected ones of said plurality of multiples of the divisor from the dividend remainder in accordance with a program;

(g) means responsive to a signal from said overdraft means indicating the absence of an overdraft produced by a current subtraction of said selected divisor multiple register for controlling said gating means to gate the results of a current subtraction to said accumulator register, whereby the accumulator register is only changed if a current subtraction did not produce an overdraft and is not changed if a current subtraction did produce an overdraft.

4. In a divider for a digital computer, the combination of:

(a) a plurality of divisor multiple registers each for holding a different selected multiple of a divisor;

(b) an accumulator register for holding a dividend remainder;

(c) single subtracting means including means for determining whether a current subtraction produces an overdraft;

(d) quotient registering means including a plurality of bistable devices each representing a bit position of a multi-bit combinatorial code in which a quotient digit value may be represented, the said bit positions of said code each being associated with one of said multiples of the divisor and having a weight value equal to the associated multiple;

(e) program means coupled to said divisor multiple registers, said accumulator register and said quotient registering means operative during the development of each quotient digit for controlling successive subtractions of the said plurality of multiples of the divisor from the dividend remainder by successively connecting selected ones of said divisor multiple registers and said accumulator to said subtracting means and causing the subtraction means to perform subtractions of the contents of each of the selected divisor multiple registers from the contents of the accumulator to produce a remainder value;

(f) means responsive to each operation of said subtraction means for setting a predetermined bistable device of said quotient registering means in accordance with the determination of the overdraft means;

(g) means operable for each subtraction for substituting the remainder produced by the subtraction for the dividend remainder in the accumulator register if the overdraft means determines that no overdraft was produced.

5. The invention defined in claim 4 wherein the divisor multiples equal the divisor multiplied by factors of 1, 2 and 4 respectively, and wherein the weight values of the bistable devices representing bit positions in said multi-bit combinatorial code are 4, 4, 2 and 1 respectively.

6. The invention defined in claim 5 wherein the program means includes:

(h) means for causing a first subtraction of the divisor multiple equal to 4 times the divisor;

(i) means responsive to an overdraft produced by said first subtraction for causing a next subtraction of the divisor multiple equal to 2 times the divisor;

(j) means responsive to absence of an overdraft produced by said first subtraction for causing a next subtraction of said divisor multiple equal to 4 times the divisor;

(k) means responsive to an overdraft produced by a second subtraction of the multiple equal to 4 times the divisor for causing a next subtraction of the multiple equal to 2 times the divisor;

(l) means responsive to absence of an overdraft produced by a second subtraction of the multiple equal to 4 times the divisor for causing a next subtraction of the multiple equal to 1 times the divisor, and (m) means responsive to subtraction of the multiple equal to 2 times the divisor for causing a next subtraction of the multiple equal to 1 times the divisor.

7. In a divider for a digital computer, the combination of:

(a) a plurality of divisor multiple registers each for holding a different selected multiple of a divisor in a first code representation;

(b) accumulator register for holding a dividend remainder in said first code representation;

(c) single subtracting means including means for determining whether a current subtraction produces an overdraft;

(d) quotient registering means including a plurality of bistable devices each representing a bit position of a second multi-bit combinatorial code in which a quotient digit value may be represented, the said bit positions of said code each being associated with one of said multiples of the divisor and having a weight value equal to the associated multiple;

(e) program means, operative during development of each quotient digit, coupled to said divisor multiple registers, said accumulator register and said quotient registering means for controlling successive subtractions of the said plurality of multiples of the divisor from the dividend remainder by selectively connecting selected ones of said divisor multiple registers and said accumulator to said subtracting means and causing the subtraction means to perform subtractions of the contents of each of the selected divisor multiple registers from the contents of the accumulator to produce a remainder value;

(f) means responsive to each operation of said subtraction means for setting a predetermined bistable device of said quotient registering means in accordance with the determination of the overdraft means;

(g) means operable for each subtraction for substituting the remainder produced by the subtraction for the dividend remainder in the accumulator register if the overdraft means determines that no overdraft was produced;

(h) a second code to first code translator connected to said quotient registering means;

(i) a quotient accumulator coupled to said code translator (h); and (j) means coupled to said quotient accumulator to cause storage of the developed quotient digit in the first code by transferring the contents of said quotient register via said translator means to said quotient accumulator.

8. A divider for a digital computer, comprising:

(a) a plurality of divisor multiple registers each for holding a different selected multiple of a divisor, one of said multiples being equal to the divisor times one;

(b) a shiftable accumulator register having high and low order ends for holding a multi-digit dividend remainder;

(c) single subtracting means including means for determining whether a current subtraction produces an overdraft;

(d) quotient registering means including a plurality of bistable devices each representing a bit position of a multi-bit combinatorial code in which a quotient digit value may be represented, the said bit positions of said code each being associated with one of said multiples of the divisor and having a weight value equal to the associated multiple;

(e) program means, operative during the development of each quotient, coupled to said divisor multiple registers, said accumulator register and said quotient registering means for controlling successive subtractions of the said plurality of multiples of the divisor from selected digit positions of the dividend remainder by successively connecting selected ones of said divisor multiple registers and predetermined digit positions of said accumulator to said subtracting means and causing the subtraction means to perform subtractions of the contents of each of the selected divisor multiple registers from the contents of said predetermined digit poistions of the accumulator to produce a remainder value;

(f) means responsive to each operation of said subtraction means for setting a predetermined bistable device of said quotient registering means in accordance with the determination of the overdraft means;

(g) means operable for each subtraction for substituting the remainder produced by the subtraction for the dividend remainder in said accumulator register if the overdraft means determines that no overdraft was produced;

(h) means for shifting said accumulator register one digit position at a time;

(i) means operable after a predetermined one of said divisor multiples has been subtracted for (1) reading the combinatorial code representation of a quotient digit from said bistable devices of the quotient registering means, (2) resetting said bistable devices, (3) operating said shifting means to shift the contents of said accumulator register one digit position toward the high order end, and (4) causing said program means to repeat successive subtractions of said plurality of divisor multiples, and (j) means responsive to a predetermined number of shifts of said accumulator register for halting operation of said divider.

9. In the divider of claim 8 which develops quotient digits by successive subtractions of a plurality of different multiples of a divisor from selected digit positions of a dividend remainder, the improvement in means, operable prior to the normal division operation defined in claim 8, for developing leading quotient zeros comprising:

(k) means for shifting said shiftable register one digit position to the left;

(l) control means responsive to a signal initiating division or to a second signal for causing said subtraction means to subtract the multiple equal to said divisor times one from selected digit positions of said dividend;

(m) means responsive to a signal from said overdraft means indicating the presence of an overdraft for activating said shifting means to shift the contents of the accumulator register one digit position toward the high order end, and for signalling a zero quotient digit and for producing said second signal, and (n) means responsive to a signal from said overdraft means indicating the absence of an overdraft for discontinuing operation of said leading quotient zero developing means and for initiating normal operation of said divider.

10. In a divider which in normal operation develops each of a plurality of quotient digits by successive subtractions of a plurality of different multiples of a divisor from selected digit positions of a dividend remainder, the improvement in means for developing leading quotient zeros comprising:

(a) a shiftable register for storing a plurality of dividend digits;

(b) a register for storing the divisor;

(c) subtracting means including overdraft means for signalling the presence or absence of an overdraft from a current subtraction;

(d) means for shifting said shiftable register;

(e) control means responsive to a signal initiating division or to a second signal for causing said subtraction means to subtract said divisor from selected digit positions of said dividend;

(f) means responsive to a signal from said overdraft means indicating the presence of an overdraft for activating said shifting means to shift the shiftable register one digit position and for signalling a zero quotient digit and for producing said second signal, and (g) means responsive to a signal from said overdraft means indicating the absence of an overdraft for discontinuing operation of said leading quotient zero developing means and for initiating normal operation of said divider.

References Cited by the Examiner

UNITED STATES PATENTS

| | | | |
|---|---|---|---|
| 2,493,862 | 1/1950 | Durfee | 235—163 |
| 2,834,543 | 5/1958 | Burkhart | 235—159 |
| 2,879,001 | 3/1959 | Weinberger et al. | 235—175 |
| 3,018,957 | 1/1962 | Havens | 235—159 |

ROBERT C. BAILEY, *Primary Examiner.*

DARYL W. COOK, MALCOLM A. MORRISON, *Examiners.*